(12) United States Patent
Saini Fasanotti et al.

(10) Patent No.: US 11,143,668 B2
(45) Date of Patent: Oct. 12, 2021

(54) SAMPLER DEVICE

(71) Applicant: DANI ANALITICA S.R.L., Cologno Monzese (IT)

(72) Inventors: Massimiliano Saini Fasanotti, Contone (CH); Roberto Taschini, Cologno Monzese (IT); Michela Barbara Gasperini, Cologno Monzese (IT)

( * ) Notice: Subject to any disclaimer, the term of this patent is extended or adjusted under 35 U.S.C. 154(b) by 179 days.

(21) Appl. No.: 16/490,987

(22) PCT Filed: Mar. 6, 2018

(86) PCT No.: PCT/IB2018/051431
§ 371 (c)(1),
(2) Date: Sep. 4, 2019

(87) PCT Pub. No.: WO2018/163061
PCT Pub. Date: Sep. 13, 2018

(65) Prior Publication Data
US 2020/0011890 A1   Jan. 9, 2020

(30) Foreign Application Priority Data

Mar. 6, 2017   (IT) .................. 102017000024734

(51) Int. Cl.
*G01N 35/10*   (2006.01)
*G01N 30/24*   (2006.01)
*G01N 35/02*   (2006.01)
*G01N 1/24*    (2006.01)
*G01N 30/02*   (2006.01)

(52) U.S. Cl.
CPC ......... *G01N 35/1065* (2013.01); *G01N 30/24* (2013.01); *G01N 35/028* (2013.01); *G01N 35/109* (2013.01); *G01N 2001/242* (2013.01); *G01N 2030/025* (2013.01)

(58) Field of Classification Search
None
See application file for complete search history.

(56) References Cited

U.S. PATENT DOCUMENTS

| 4,478,094 A | 10/1984 | Salomaa | |
|---|---|---|---|
| 4,938,080 A | 7/1990 | Sarrine | |
| 5,988,236 A | 11/1999 | Fawcett | |
| 7,178,414 B1 * | 2/2007 | Kokosa | .................. G01N 30/24 73/863.32 |

(Continued)

*Primary Examiner* — Kathryn Wright
(74) *Attorney, Agent, or Firm* — Themis Law

(57) ABSTRACT

A sampler device for gas chromatography includes a first unit that supports and moves a second, single instrument holding unit carrying at least two instruments with respective control plungers for taking/inserting samples to be analyzed, and a third unit that actuates the plungers simultaneously. The first unit is mounted on a base and moves the second and third units along horizontal and vertical directions and between a first and a second station, at least one of which is defined beyond the plan encumbrance of the base. A control unit automatically controls the movement of the first unit between the first station, with the third unit controlled by the control unit to simultaneously take the samples to be analyzed by the two instruments, and the second station, with the third unit controlled by the control unit to simultaneously insert the previously taken samples within two distinct injectors of a gas chromatograph.

17 Claims, 3 Drawing Sheets

(56) References Cited

U.S. PATENT DOCUMENTS

Figure 1:
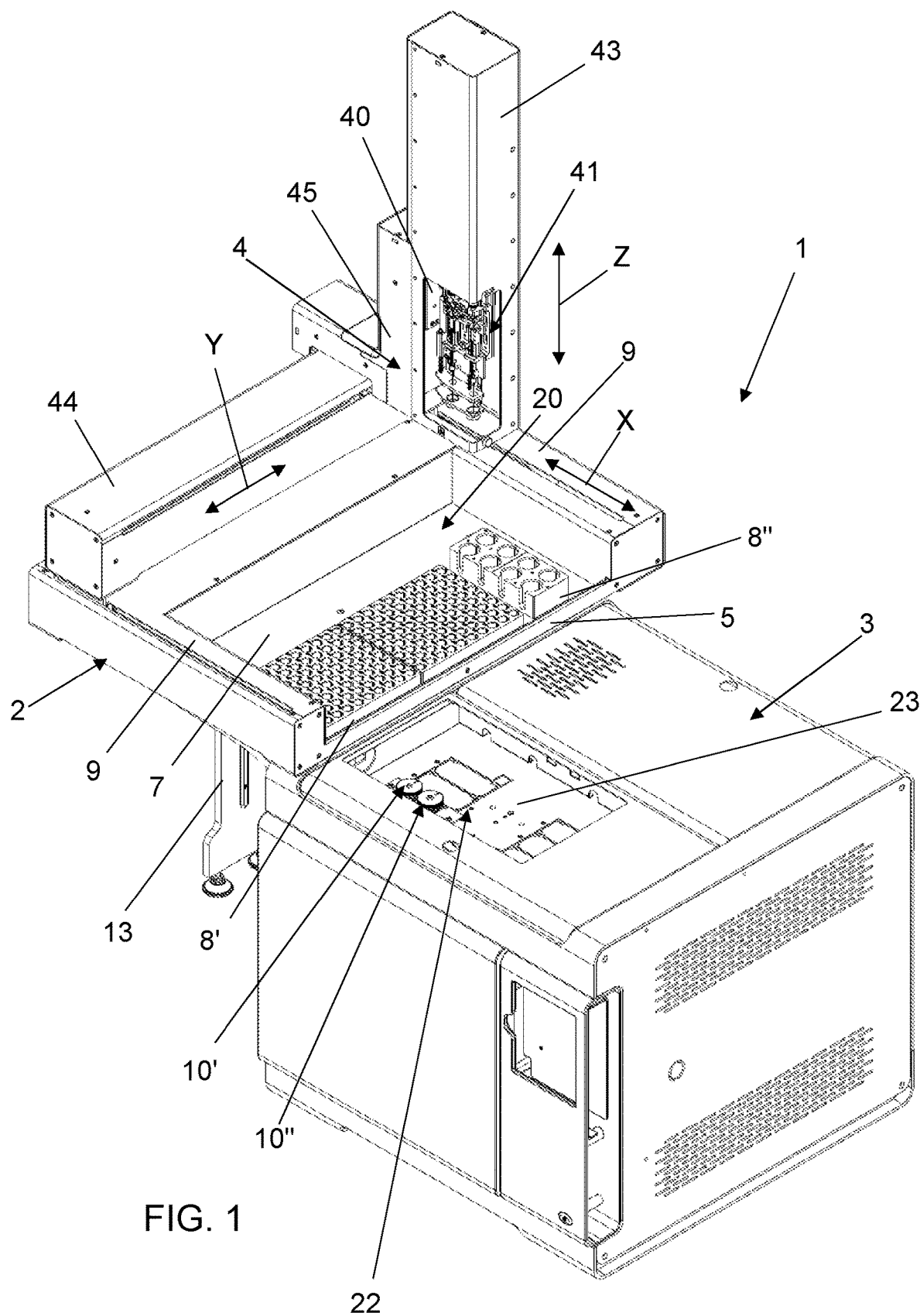

| | | |
|---|---|---|
| 2002/0160521 A1 | 10/2002 | Ozbal |
| 2009/0260456 A1* | 10/2009 | Degli Esposti ........ G01N 1/405 |
| | | 73/863.21 |
| 2015/0233958 A1* | 8/2015 | Schueler .......... G01N 35/00603 |
| | | 73/863.01 |
| 2016/0245730 A1 | 8/2016 | Neal |

* cited by examiner

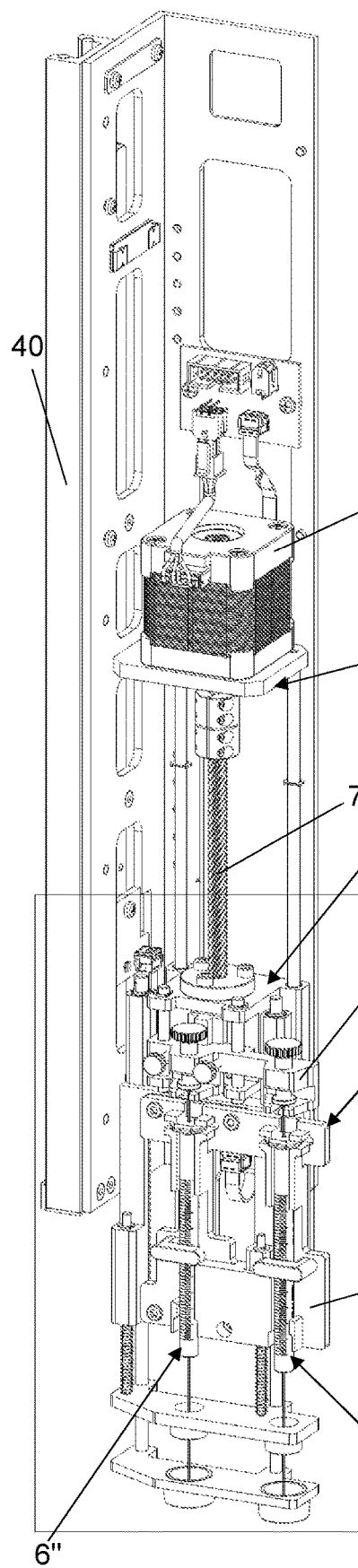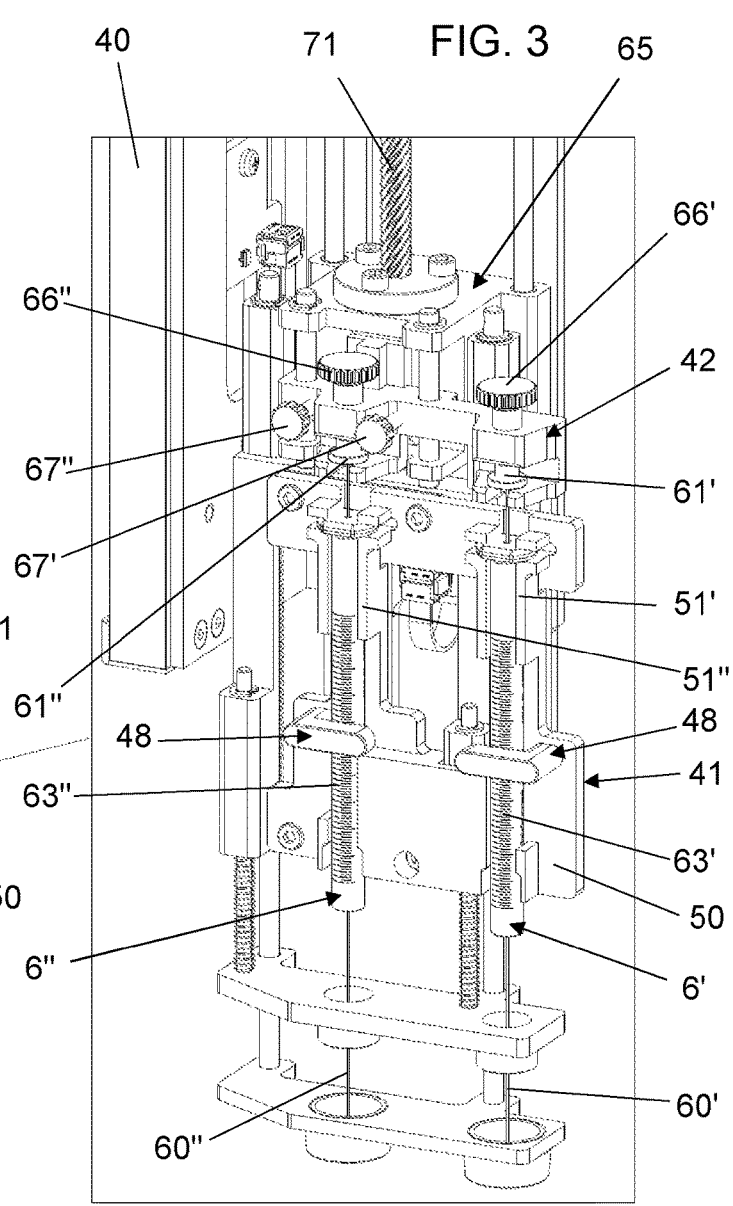

SAMPLER DEVICE

The present invention relates to an improved sampler device for gas chromatography, in particular for simultaneously taking at least two liquid samples and for simultaneously inserting them into corresponding injectors of a gas chromatograph, as well as an apparatus for chemical analyses comprising such a device.

Chromatographs and, in particular, gas chromatographs are known, which are widely used for carrying out analyses in many sectors, such as, for example, the petrochemical, environmental, pharmaceutical, aromas and perfumes sectors. Usually, a gas chromatography system comprises a gas chromatograph, which consists of an instrument composed of three fundamental parts: an injector, a heating chamber (oven) and a detector system.

Inside the heating chamber there is a gas chromatographic column, which forms the heart of the system and in which the analytes of interest are separated. There are different types of injectors, by means of which the different types of sample introduction are realized.

Currently, in such a context, there is a growing demand to increase the productivity of analysis laboratories, i.e., to increase the number of analyses carried out in a given time span.

In light of the above, an apparatus has already been proposed, provided with two independent samplers, which work in parallel, for introducing the samples to be analyzed into two corresponding injectors of a gas chromatography system. More in detail, therefore, such an apparatus comprises two towers for the support and movement of respective robotic arms and on each of these a syringe is mounted for taking the samples and inserting them within one of the two injectors of the gas chromatography system. Such a solution is not satisfactory since, in addition to being rather complex constructively, it is particularly expensive.

An apparatus has also been already proposed with a sampler which is provided with a single robotic arm, which supports and moves a corresponding syringe, which injects in sequence (i.e., at different times) the samples inside two corresponding injectors of a gas chromatography system. This solution is also not satisfactory since the injection in sequence produces a delay in retention times, with the resulting poor accuracy and precision of the analytical results.

US2002/0160521 provides containers with samples to be taken which arranged on a surface which is movable, such as, for example, a conveyor belt. In addition, US2002/0160521 generally provides syringe plungers which are activated by step, robotic and computer-assisted translations. In particular, a mechanism is provided for to transform the rotary movement of a motor, which is not mounted on board the syringe holding unit, into a linear movement which produces the actuation of the plunger. Furthermore, a rotary encoder is provided for, which is associated with the rotary transmission means which then produce the actuation of the syringe plungers and, using the data provided by such an encoder, the motor is correspondingly controlled so as to define the dosage of the fluid to be dispensed with the syringe.

U.S. Pat. No. 5,988,236 describes a device provided with a base on which a unit for the support and movement of a probe holding unit is mounted. The unit for the actuation of the plungers associated with the probes is not mounted on the support and movement unit but is positioned laterally to the latter and is mounted/fastened on said base. This device is rather cumbersome and complicated to realize.

U.S. Pat. No. 4,478,094 describes a solution in which a shelf is provided for, on which the trays for supporting the containers with the samples to be taken are positioned, and such a shelf is moved along a horizontal axis so as to face different trays at the taking station, which is provided with a support and movement unit which is only vertically movable.

GB1306365 describes a solution in which the actuation of the syringe plungers is motorized only downwards to carry out the dispensing of the sample, while the filling of the syringes with the sample to be dispensed, which is carried out by raising the bar acting on the syringe plungers, is carried out manually by acting on a handle fastened to said bar. Furthermore, means are provided for to adjust only the amount of sample to be dispensed by means of the syringe, and not to adjust the amount of sample to be taken and inserted into said syringe.

It is the object of the invention to propose an improved sampler device for gas chromatography which overcomes the drawbacks of traditional solutions and which is completely automated.

It is another object of the invention to propose a device which, at the same time, allows for a high productivity, precision and analytical repeatability.

It is another object of the invention to propose a device which may be used and/or interfaced with any type of gas chromatograph, even already existing and operative.

It is another object of the invention to propose a device which may be easily customized based on different analytical requirements.

It is another object of the invention to propose a device with an alternative and/or improved characterization, both in constructive and functional terms, as compared to traditional ones.

It is another object of the invention to propose a device which may be produced in a simple, fast and cost-effective manner.

It is another object of the invention to propose a device which is independent, from the constructive and/or software control point of view, from the gas chromatograph.

These objects, both individually and in any combination thereof, as well as other objects which will become apparent from the following description, are achieved, according to the invention, by a device as defined in claim 1 and by an apparatus as defined in claim 32.

Figure 4:
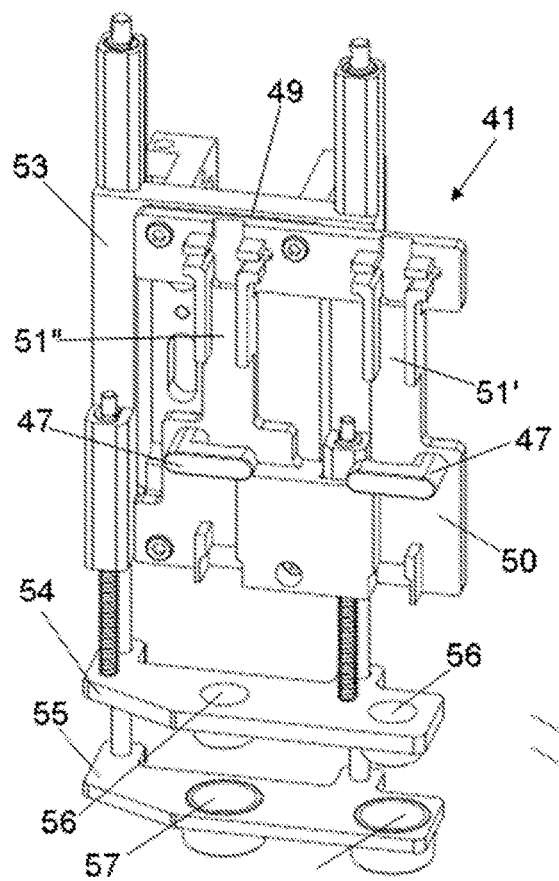
Figure 5:
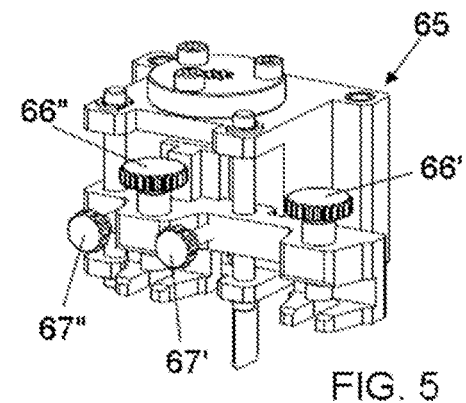
Figure 7:
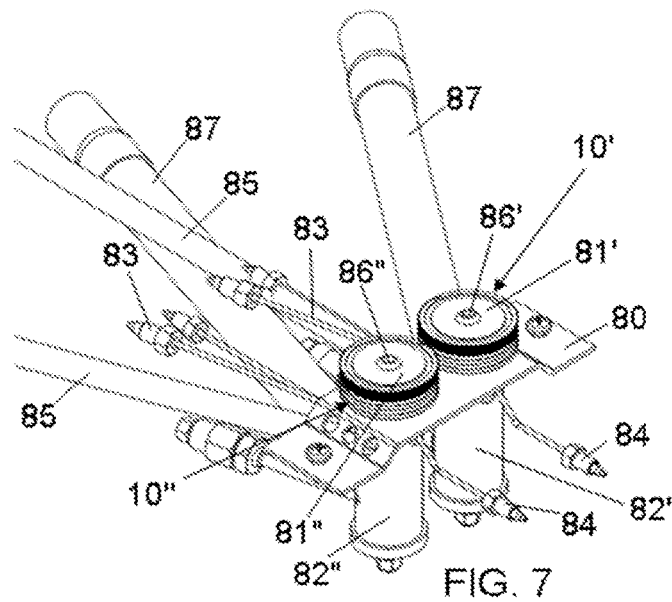
Figure 6:
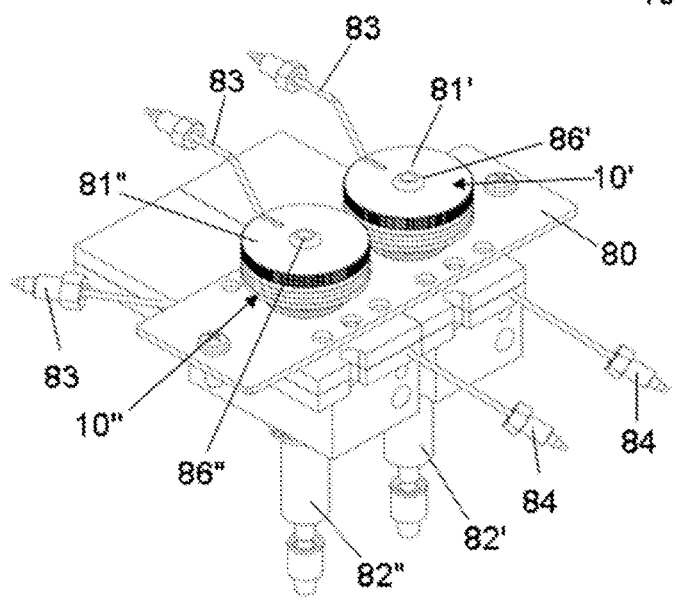

The present invention is further clarified below in a preferred embodiment thereof, given merely by way of explanation and not by way of limitation with reference to the accompanying drawings, in which:

FIG. 1 shows a perspective view of an apparatus with a device in accordance with the invention, FIG. 2 shows a perspective view of a part of the device of FIG. 1, FIG. 3 shows an enlarged detail of FIG. 2, FIG. 4 shows a perspective view of a first component of the device in accordance with the invention, FIG. 5 shows a perspective view of a second component of the device in accordance with the invention, FIG. 6 shows a perspective view of a first embodiment of the injectors of the gas chromatograph of the apparatus in accordance with the invention, and FIG. 7 shows a perspective view of a second embodiment of the injectors of the gas chromatograph of the apparatus in accordance with the invention.

As shown in the Figures, the analytical apparatus in accordance with the invention, indicated, overall, with numeral 1, comprises an improved sampler device in accordance with the invention, indicated, overall, with numeral 2, and a gas chromatograph 3 which substantially is of the traditional type.

In particular, the sampler device 2 is preferably of the automatic type and comprises a base (or platform) 5. Suitably, the base 5 is substantially horizontal and, preferably, mounted on a lower support element 13.

Preferably, in the base 5 a shelf 7 is defined, which is laterally delimited by two sides 9.

On the shelf 7 one or more traditional support plates 8' and 8" are positioned for containers, preferably shaped like vials, which are arranged tidily thereon. More in detail, the support plates 8' and 8" comprise a plurality of seats, preferably comprising holes, for the insertion and the support of the containers. Suitably, both plates 8' with seats sized to support the vials containing the sample to be analyzed, and plates 8" with seats sized to support the containers of the washing liquid for the syringes 6' and 6" of the sampler device 2 are provided for.

Advantageously, in the apparatus 1 the gas chromatograph 3 is adjacent to the sampler device 2. Preferably, the upper surface 23 of the gas chromatograph 1 is arranged and configured so as to continuously extend, and appear substantially coplanar to, the base 5 and/or to the shelf 7 of the device 2.

Preferably, in the apparatus 1, the sampler device 2 is constructively independent from the gas chromatograph 3.

The sampler device 2 also comprises a unit 4 for the support and movement of a single instrument holding unit 41, on which, preferably, two or more traditional syringes 6' and 6" are mounted. In particular, each syringe 6' or 6" comprises a hollow cylindrical body 63' or 63", with a needle 60' or 60" grafted at one end thereof, and inside which a tight plunger controlled by corresponding plungers 61' or 61" slides.

The unit 4 is also configured to support and actuate a unit 42 for the simultaneous actuation of the plungers 61' and 61" of both the syringes 6' and 6" mounted on the instrument holding unit 41.

The support and movement unit 4 is mounted on the base 5 of the device 2 and is configured to move said instrument holding 41 and actuation units 42 along at least one direction substantially horizontal and parallel (i.e., along X and/or Y) to said base 5 and along a direction substantially vertical and perpendicular (i.e., along Z) to said base 5.

The support and movement unit 4 is configured to move the instrument holding unit 41 and the unit 42 for the simultaneous actuation of the plungers 61' and 61" of both the syringes 6' and 6" between a first station 20 and a second station 22, where at least one of the first station 20 and the second station 22 are defined beyond the plan encumbrance of the base 5 of the device 2.

Preferably, the first station 20 is defined inside the plan encumbrance of the base 5 of the device 2, while the second station 22 is defined outside the plan encumbrance of the base 5 of the device 2. Advantageously, to this end, the support and movement unit 4 is configured to move the instrument holding unit 41 and the unit 42 for the simultaneous actuation of the plungers 61' and 61" of both the syringes 6' and 6", so as to bring them in a condition/position in which they laterally protrude beyond (i.e., over) the plan encumbrance of the base 5 of the device 2, so that the syringes 6' and 6" appear facing the second station 22 from above.

The sampler device 2 also comprises a control unit, implemented, for example, by means of a microcontroller, to suitably control the movement of both the support unit 4 and the unit 42 for the simultaneous actuation of the plungers 61' and 61" of both the syringes 6' and 6".

Suitably, the control unit of the sampler device 2 may be either directly installed on board the device itself or may be installed outside it. Preferably, the control unit of the sampler device 2 is implemented inside an external computer, electrically connected to the motorized members and to the sensors provided for the automated movement of said units 4, 41 and 44. Advantageously, the control unit of the sampler device 2 may be the same which monitors and controls the gas chromatograph 3.

In particular, the control unit is configured to automatically control the movement of the support unit 4 between a first station 20, which is preferably defined at the shelf 7 and/or inside the base 5, in which the unit 42 is also, preferably automatically, controlled, to simultaneously actuate the plungers 61' and 61" and, thus, to take inside the two syringes 6' and 6" the samples to be analyzed contained within two distinct containers positioned on the supports 8' or 8", and a second station 22, which is preferably defined outside the base 5, in which the unit 42 is preferably automatically, controlled to simultaneously actuate the plungers 61' and 61", and, thus, to insert the samples previously taken by means of said two syringes 6' and 6" within two corresponding injectors 10' and 10" of the gas chromatograph 3.

Suitably, the injectors 10' and 10" are positioned on the upper surface 23 of the casing of the gas chromatograph 3 and are associated with respective chromatographic columns (not shown). In particular, "chromatographic column" means a capillary tube of any material, suitably treated for carrying out analyzes, i.e., both a capillary tube filled with stationary phase, and a capillary tube not filled with stationary phase (precolumn).

Suitably, in order to move between the two stations 20, 22, the support and movement unit 4 is configured to move the instrument holding 41 and actuation units 42 along:

at least one horizontal direction X and/or Y, preferably along the two directions X, Y of a substantially horizontal Cartesian plane defined above the shelf 7 and the injectors 10' and 10", and along a vertical direction Z, preferably moving towards/away from said shelf 7 and said injectors 10' and 10".

In particular, the support and movement unit 4 comprises:

a bracket 40 on which both the instrument holding unit 41 and the unit 42 for the simultaneous actuation of the plungers 61' and 61" of both the syringes 6' and 6" are mounted, a tower 43 on which the bracket 40 is mounted and which is provided with motorized means which produce the vertical movement, i.e. along the direction Z, of the bracket 40 with respect to the tower itself, a crosspiece 44 on which the tower 43 is mounted, and therefore also the bracket 40 with the units 41 and 42, and which is provided with motorized means which produce the forward and backward movement of the tower 43 along a direction Y defined by the development of the crosspiece itself.

Furthermore, the crosspiece 44 is associated with motorized means which produce the translation thereof along the direction X on the sides 9 of the base 5.

Suitably, the tower 43 is mounted on the crosspiece 44 by means of a preferably L-shaped arm 45, which makes the tower itself protrude forwards with respect to the crosspiece 44. In particular, following the translation of the crosspiece 44 along the direction X towards the gas chromatograph 3, this allows the tower 43 to reach a position which is above the station 22 of the gas chromatograph 3, i.e., beyond the area occupied below by the shelf 7 and/or the base 5 of the device 2. In essence, suitably, the support and movement unit 4 comprises at least one component 45 which is configured and/or sized so that the instrument holding unit 41 and the unit 42 for the actuation protrude with respect to a component 44 of said unit 4, which is movable horizontally and parallel to said base 5.

The instrument holding unit 41 comprises a first element 50 which is provided both with means 48 for supporting and fastening at least two syringes 6' and 6", and with means 49 for the, preferably removable, fastening thereof to said support and movement unit 4. Preferably, the first element 50 of the instrument holding unit 41 is removably fastened to a second element 53 which is integral to the support and movement unit 4.

Advantageously, the means 48 for supporting and fastening at least two syringes 6' and 6" are provided, at a first face, preferably a front face, with said first element 50, while the means 49 for the removable fastening to said support and movement unit 4 are provided, at a second face, preferably a rear face, with said first element 50.

Preferably, said first and second faces are parallel and opposite to each other.

Advantageously, the removable fastening means 49 are configured to couple the first element 50 with the support unit 4 (directly or by means of said second element 53) without having to use special tools, such as, for example, screwdrivers or the like. In particular, these removable fastening means 49 comprise a removable interlocking coupling, for example, of the male-female type, or preferably provide for a magnetic coupling.

Suitably, the first element 50 is a frame which, preferably, comprises a plate of a substantially rectangular shape.

Suitably, the second element 53 comprises a structure which is fastened to the bracket 40.

Advantageously, the means 48 for supporting and fastening at least two syringes 6' and 6" comprise elastic and/or rotating flaps to hook the respective tubular bodies 63' and 63" of the two syringes 6' and 6".

Advantageously, the means 48 for supporting and fastening at least two syringes 6' and 6" comprise two parallel seats 51 obtained in the first element 50 and configured for firmly house the respective tubular bodies 63' and 63" of the two syringes 6' and 6". In particular, each seat 51 comprises lateral containment and guiding walls, as well as an L-shaped revolving pivot 47 pivoted to the plate of the first element 50. Suitably, the revolving pivot 47 rotates between a substantially horizontal front locking position of the respective tubular body 63' or 63" of the syringe, and a substantially vertical position for inserting and removing the corresponding syringe.

Advantageously, the instrument holding unit 41 comprises needle guiding means which, preferably, are integral to the second element 53. In particular, the needle guiding means comprise at least one plate or, preferably, two parallel plates 54 and 55, both provided with pairs of through holes facing each other, respectively 56 and 57. Suitably, the pairs of holes 56 and 57 are crossed by the needles 60' and 60" and allow to guide the latter during the step of penetrating the needles themselves both inside the containers for taking the samples, and inside the injectors 10' and 10" of the gas chromatograph 3 for inserting the samples taken.

Suitably, the first element 50 is associated posteriorly, preferably by means of said removable fastening means 49, with said second element 53, which it supports from below, by means of suitable rods of the needle guiding means.

The unit 42 for the simultaneous actuation of the plungers 61', 61" of both the syringes 6' and 6" comprises a single actuator 70, for example an electric motor, for moving at least one motion transmission element 71, preferably defined by a worm screw, which is associated with a single mechanism 65 which is suitably configured to transform the rotation of the actuator 70 and/or of the transmission element 71 into a simultaneous translation of the plungers 61', 61" of both the syringes 6' and 6". In essence, the same actuator 70 and/or transmission element 71 produce the simultaneous activation (i.e., at the same instant) of both plungers 61', 61" of the syringes 6' and 6".

Advantageously, the actuator 70 of the unit 42 for the actuation of the plungers 61', 61" is mounted on board the support and movement unit 4 and, preferably, is fastened to the bracket 40.

Advantageously, the mechanism 65 comprises first adjustment means 66' and 66", preferably independent from each other, to firmly lock in position, inside the mechanism itself, the corresponding plungers 61', 61" of both the syringes 6' and 6".

Advantageously, the mechanism 65 comprises second adjustment means 67' and 67", preferably independent from each other, to vary the locking/clamping height of the plungers 61', 61" of both the syringes 6' and 6" within the respective seats defined in the mechanism itself, so as to adjust, thus, the amount of sample to be taken from the containers and to be then inserted in the injectors 10' and 10" of the gas chromatograph. Suitably, the second adjustment means 67' and 67" are configured to independently and individually adjust the locking/clamping position of each plunger 61' or 61" inside the respective seat of the mechanism 65.

As mentioned above, the injectors 10' and 10" are installed and fastened on the upper surface 23 of the casing of the gas chromatograph 3 at the inlet operating area of the latter.

Preferably, in the gas chromatograph 3, the injectors 10' and 10" are positioned at a well-defined mutual distance so as allow/facilitate the simultaneous introduction of the needles 60' and 60" of the syringes 6' and 6". Suitably, to this end, the injectors 10' and 10" are fastened, for example, by means of welding, on a single plate 80 which, in turn, is fastened, for example, by means of traditional fastening screws, to the upper surface 23 of the casing of the gas chromatograph 3 at the inlet operating area thereof.

Advantageously, the injectors 10' and 10" comprise corresponding housing blocks 81' and 81" which are placed above the plate 80 and which centrally have respective axial cavities 86' and 86" for receiving and guiding the needles 60' and 60" of the syringes 6' and 6" during the insertion of the samples in the respective injectors.

Suitably, the injectors 10' and 10" are of the traditional type and also comprise, below the plate 80, corresponding chambers 82' and 82", gas inlets 83 and outlets 84, as well as the wiring 85 for the heating and monitoring means. Suitably, the center distance between the needles 60' and 60" and/or the cylindrical bodies 63' and 63" of the two syringes 6' and 6", when mounted on the instrument holding unit 41, substantially coincides with the center distance of the injectors 10' and 10" and, in particular, of the axial cavities 86' and 86" thereof. Preferably, such a center distance between the needles 60' and 60" and/or the cylindrical bodies 63' and 63" of the two syringes 6' and 6", when mounted on the instrument holding unit 41, substantially coincides also with the center distance of the seats which are defined in the support plates 8' and 8" and in which the containers with the sample or the washing liquid are inserted.

Advantageously, the fact that the injectors 10' and 10" are mounted on a single plate 80 ensures that the center distance thereof coincides with that of the two syringes 6' and 6" mounted on the instrument holding unit 41.

Suitably, the injectors 10' and 10" may be of the split/splitless type, and be mounted on a plane plate 80 (see FIG. 6), or may be of the PTV type, i.e., of the "programmed temperature vaporization" type, and be mounted on a plate 80 slightly centrally raised (see FIG. 7). In particular, in the latter case, tubes 87 are provided for to convey the cooling inside the chambers 82' and 82" of the injectors 10' and 10".

Inside the control unit of the sampler device 2, a software is installed and executed, which automatically manages the programmed sequence of various operating steps, described hereinafter. In particular, such a software controls the operating steps of taking samples from the containers and inserting them into the injectors 10' and 10" of the gas chromatograph 3 and, advantageously, it may be configured/customized by the operator by means of a traditional control interface of the gas chromatograph 3 and/or of an external PC which may be connected to the device 2.

Advantageously, the sampler device 2 in accordance with the invention is constructively of the stand-alone type. In particular, the base 5 of the device 2 is independent from the casing of the gas chromatograph 3, even if, preferably, it may be mechanically associated with the latter.

The operation of the sampler device 2 is as follows.

Initially, the support and movement unit 4 of the device 2 is controlled so as to be brought at the first station 20 and, in particular, to bring the tower 43 thereof above the plates 8' for the support of the containers of the samples to be analyzed.

Once the two syringes 6' and 6" appear vertically aligned to the respective containers of the sample to be taken, the descent of the frame 40 is controlled to allow the needles 60' and 60" of the syringes 6' and 6" to penetrate inside the containers themselves.

Then, the unit 42 which produces the simultaneous actuation of the plungers 61', 61" of both the syringes 6' and 6" is controlled, so as to take an amount of sample which had been previously and suitably defined, by acting on the second adjustment means 67' and 67".

Once taken the samples, the frame 40 rises so as to make the needles 60' and 60" of the syringes 6' and 6" come out of the respective containers and the support and moving unit 4 is suitably controlled to be brought at the station 22, and in particular to bring the tower 43 thereof outside the shelf 7 (and the base 5) and above the injectors 10' and 10" of the gas chromatograph 3.

Therefore, once the two syringes 6' and 6" appear vertically aligned to the respective injectors 10' and 10" of the gas chromatograph 3, the descent of the frame 40 is controlled again to allow the needles 60' and 60" of the syringes 6' and 6" to penetrate inside the axial cavities 86' and 86" of said injectors.

Finally, the group 42 is activated, which produces the simultaneous actuation of the plungers 61', 61" of both the syringes 6' and 6" to simultaneously insert the samples, which had previously been taken, inside the chambers 82' and 82' of the injectors 10' and 10" for the gas chromatographic analysis thereof.

Once the insertion of the samples within the respective injectors 10' and 10" ends, the return to the first station 20 of the support and movement unit 4 is suitably controlled to carry out further takings.

Suitably, according to an embodiment not shown herein, on the same support and movement unit 4 according to the invention, the units 41 and 42 set up for two syringes 6' and 6", as described above, may be easily removed so as to be replaced with a traditional instrument holding unit comprising a single seat for a single syringe, as well as with a unit 42 configured to produce the actuation of the plunger of said syringe.

In the embodiment described herein and shown in the Figures, the taking/inserting instruments consist of two syringes 6' and 6", however, it is understood that such taking/inserting instruments may also comprise two or more traditional SPME probes (i.e., for the solid phase microextraction), each of which comprises a coated fused silica fiber which is slidingly inserted into a protective needle and which is associated, at one end, with a control plunger, the sliding of which produces the escape/retraction of a portion of fiber from said needle, so as to allow first taking the sample to be analyzed at the first station 20 and then the subsequent insertion, at the second station 22, of the sample previously taken into one of the injectors 10' or 10" of the gas chromatograph 3. In particular, on the same instrument holding unit 41, as described above and shown in the Figures, two SPME probes may be mounted while the same unit 42, as described above and shown in the Figures, is configured to produce the simultaneous actuation of the corresponding plungers of the SPME probes and thus allow the escape/retraction of a portion of fiber from the protective needle.

As a result, the improved sampler device, as well as the apparatus comprising such a device, appear particularly advantageous since:

they allow to double the number of samples analyzed per unit of time, they reduce the cost of each gas chromatographic analysis, they allow a high reproducibility of retention times, which, in gas chromatography, are fundamental for the correct identification of the components of the sample to be analyzed; in particular, the fact that the two samples are injected simultaneously ensures that they are subjected to a gas chromatographic analysis which is characterized by the same start temperature, as well as by the same intermediate temperature variations, it has a simple, compact design and the realization thereof is inexpensive, it allows to use different types of taking/inserting instruments (such as, syringes and/or probes SPME) depending on the analytical requirements.

Furthermore, unlike the solutions described in US2002/0160521, U.S. Pat. Nos. 5,988,236, 4,478,094 and GB1306365, the support and movement unit, on which both the instrument holding unit and the unit for the actuation of the corresponding plungers of the taking/inserting instruments are mounted, is configured to be moved and brought into at least one station (preferably that provided for the insertion of the samples previously taken) in which the taking/inserting instruments protrude laterally beyond the plan encumbrance of the base on which said support and movement unit is mounted. This is particularly advantageous since it makes this device—which is of the stand-alone type from a constructional point of—md easily usable and/or interfaceable with any type of gas chromatograph, even already existing and operative.

The invention claimed is:

1. An improved sampler device (2) for gas chromatography comprising:

a first unit (4) configured to support and move both a second, single instrument holding unit (41), on which at least two instruments are mounted, provided with respective control plungers (61', 61"), for taking/inserting (6', 6") samples to be analyzed, and a third unit (42) configured to simultaneously actuate the respective control plungers (61', 61") of said at least two instruments (6', 6"), said first unit (4) extending upwardly from a base (5) that is structurally independent from a gas chromatograph and being configured to move said second (41) and third units (42) along at least one direction (X, Y) substantially horizontal and parallel to said base (5) and along a direction (Z) substantially vertical and perpendicular to said base (5), said first unit (4) being also configured to move said second (41) and third units (42) between a first station (20) positioned on said base and a second station (22) positioned on the gas chromatograph, said second station (22) being defined beyond a plan encumbrance of said base (5) on which said first unit (4) is mounted; and a control unit which automatically controls a movement of said first unit (4) between said first station (20), wherein said third unit (42) is controlled by said control unit to simultaneously take the samples to be analyzed by said at least two instruments, and said second station (22), wherein said third unit (42) is controlled by said control unit to simultaneously insert the samples previously taken by said at least two instruments (6', 6") within two distinct injectors (10', 10") of the gas chromatograph (3), wherein the control unit automatically controls the movement of said first unit (4) so that:

in said first station (20), said at least two instruments (6', 6"), mounted in said second unit (41), are vertically aligned to distinct corresponding containers with the samples to be taken, and in said second station (22), said at least two instruments (6', 6"), mounted in said second unit (41), are vertically aligned to the two injectors (10', 10") of the gas chromatograph (3), wherein said base (5) comprises a shelf (7) for positioning at least one support plate (8', 8") provided with a plurality of seats for insertion and support of the containers with the samples to be taken, said first station (20) being defined at said shelf (7), and wherein a center distance between said two instruments (6', 6") mounted on the second unit (41) corresponds to the center distance between the seats of said at least one support plate (8', 8").

2. The improved sampler device according to claim 1, wherein said first unit (4) comprises at least one component (45) configured and/or sized so that said second unit (41) and said third unit (42) protrude with respect to a component (44) of said first unit which is movable parallel to said base (5).

3. The improved sampler device according to claim 1, wherein the second unit (41) comprises a first element (50) which is provided with means (48) for supporting and fastening the at least two instruments, (6', 6") and with means (49) for removably fastening the at least two instruments to said first unit (4).

4. The improved sampler device according to claim 3, wherein said means (48) for supporting and fastening the at least two instruments (6', 6") are provided, at a first face with said first element (50), while said means (49) for removably fastening to said support and movement unit (4) are provided, at a second face with said first element (50).

5. The improved sampler device according to claim 3, wherein said means (48) for supporting and fastening the at least two instruments (6', 6") comprise at least two seats (51) for inserting/housing said instruments (6', 6") and members (47) configured to firmly lock said instruments in position.

6. The improved sampler device according to claim 1, wherein the second unit (41) comprises guiding means for respective needles of said at least two instruments (6', 6").

7. The improved sampler device according to claim 1, wherein said third unit (42) comprises a single actuator (70) connected to a mechanism (65) configured to produce a simultaneous translation of the control plungers (61', 61") of both of said instruments (6', 6").

8. The improved sampler device according to claim 7, wherein said single actuator (70) is mounted on board the first unit (4).

9. The improved sampler device according to claim 7, wherein said mechanism (65) is configured to transform a rotation of said single actuator (70), and/or of a transmission element (71) associated thereto, into a simultaneous translation of the control plungers (61', 61") of both of said instruments (6', 6").

10. The improved sampler device according to claim 1, wherein said third unit (42) comprises first adjustment means (66', 66") configured to firmly lock in position the control plungers (61', 61") of both of said instruments (6', 6").

11. The improved sampler device according to claim 1, wherein the third unit (42) comprises second adjustment means (67', 67") configured to vary a locking height of the control plungers (61', 61") of both of said instruments (6', 6") and thus adjust an amount of sample to be taken from said containers.

12. The improved sampler device according to claim 1, wherein a center distance between said two instruments (6', 6") mounted on the second unit (41) corresponds to the center distance between the two distinct injectors (10', 10") of the gas chromatograph (3) in which the samples taken are intended to be inserted.

13. The improved sampler device according to claim 1, wherein said instruments (6', 6") comprise at least two syringes or at least two probes with respective fibers for solid phase micro-extraction (SPME).

14. An analytical apparatus (1) comprising:
a sampler device (2) comprising:
a first unit (4) configured to support and move both a second, single instrument holding unit (41), on which at least two instruments are mounted, provided with respective control plungers (61', 61"), for taking/inserting (6', 6") samples to be analyzed, and a third unit (42) configured to simultaneously actuate the respective control plungers (61', 61") of said at least two instruments (6', 6"), said first unit (4) extending upwardly from a base (5) that is structurally independent from a gas chromatograph and being configured to move said second (41) and third units (42) along at least one direction (X, Y) substantially horizontal and parallel to said base (5) and along a direction (Z) substantially vertical and perpendicular to said base (5), said first unit (4) being also configured to move said second (41) and third units (42) between a first station (20) positioned on said base and a second station (22) positioned on the gas chromatograph, said second station (22) being defined beyond a plan encumbrance of said base (5) on which said first unit (4) is mounted; and a control unit which automatically controls a movement of said first unit (4) between said first station (20), wherein said third unit (42) is controlled by said control unit to simultaneously take the samples to be analyzed by said at least two instruments, and said second station (22), wherein said third unit (42) is controlled by said control unit to simultaneously insert the samples previously taken by said at least two instruments (6', 6") within at least two distinct injectors (10', 10") of the gas chromatograph (3); and the gas chromatograph (3) comprising the at least two distinct injectors (10', 10"), wherein the control unit automatically controls the movement of said first unit (4) so that:

in said first station (20), said at least two instruments (6', 6"), mounted in said second unit (41), are vertically aligned to distinct corresponding containers with the samples to be taken, and in said second station (22), said at least two instruments (6', 6"), mounted in said second unit (41), are vertically aligned to the two injectors (10', 10") of the gas chromatograph (3), wherein said base (5) comprises a shelf (7) for positioning at least one support plate (8', 8") provided with a plurality of seats for insertion and support of the containers with the samples to be taken, said first station (20) being defined at said shelf (7), and wherein a center distance between said two instruments (6', 6") mounted on the second unit (41) corresponds to the center distance between the seats of said at least one support plate (8', 8").

15. The analytical apparatus according to claim 14, wherein said at least two distinct injectors (10', 10") are fastened to a same plate, which in turn is fastened to a surface of a casing of the gas chromatograph (3).

16. The analytical apparatus according to claim 14, wherein a center distance between said at least two instruments (6', 6") mounted on the second (41) of said sampler device (2) corresponds to a center distance between two inlet axial cavities (86', 86") of said injectors (10', 10") of the gas chromatograph (3).

17. The analytical apparatus according to claim 16, wherein the center distance between said at least instruments (6', 6") mounted on the second unit (41) of said sampler device (2) corresponds to the center distance between the two inlet axial cavities (86', 86") of said injectors (10', 10") of the gas chromatograph (3) and also corresponds to a center distance of seats which are defined in support plates (8', 8") comprises in said base and in which containers with the sample or a washing liquid to be taken by said at least two instruments are inserted.

* * * * *